(12) United States Patent
Ristock

(10) Patent No.: US 9,049,205 B2
(45) Date of Patent: Jun. 2, 2015

(54) SYSTEM AND METHODS FOR LOCATING AND ACQUISITIONING A SERVICE CONNECTION VIA REQUEST BROADCASTING OVER A DATA PACKET NETWORK

(75) Inventor: Herbert Willi Artur Ristock, Walnut Creek, CA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 2399 days.

(21) Appl. No.: 11/317,106

(22) Filed: Dec. 22, 2005

(65) Prior Publication Data

US 2007/0147347 A1 Jun. 28, 2007

(51) Int. Cl.
| | |
|---|---|
| *H04L 12/66* | (2006.01) |
| *H04L 29/08* | (2006.01) |
| *H04W 4/00* | (2009.01) |
| *H04L 12/42* | (2006.01) |
| *H04L 12/403* | (2006.01) |
| *G06F 15/16* | (2006.01) |
| *H04L 12/18* | (2006.01) |

(52) U.S. Cl.
CPC ............... *H04L 67/104* (2013.01); *H04L 12/18* (2013.01); *H04L 67/16* (2013.01); *H04L 67/1068* (2013.01)

(58) Field of Classification Search
USPC .................. 370/352, 329, 455; 455/450, 512; 709/203, 201, 248
See application file for complete search history.

(56) References Cited

U.S. PATENT DOCUMENTS

| | | | |
|---|---|---|---|
| 5,157,390 A | 10/1992 | Yoshie et al. | |
| 6,192,248 B1* | 2/2001 | Solondz | 455/450 |
| 7,062,555 B1* | 6/2006 | Kouznetsov et al. | 709/225 |
| 2002/0027906 A1 | 3/2002 | Athreya et al. | |
| 2002/0059405 A1 | 5/2002 | Angwin | |
| 2002/0085491 A1* | 7/2002 | Beshai et al. | 370/230 |
| 2002/0099842 A1 | 7/2002 | Jennings et al. | |
| 2002/0141378 A1* | 10/2002 | Bays et al. | 370/351 |
| 2003/0054799 A1 | 3/2003 | Shin | |

(Continued)

FOREIGN PATENT DOCUMENTS

| | | |
|---|---|---|
| CN | 101444053 A | 5/2009 |
| EP | 1964343 A2 | 9/2008 |

(Continued)

OTHER PUBLICATIONS

Examination Report issued by the Government of India Patent Office for Indian patent application No. 5363/DELNP/2008, mailing date of Feb. 28, 2014 (2 pages).

(Continued)

*Primary Examiner* — Asad Nawaz
*Assistant Examiner* — Stephanie Chang
(74) *Attorney, Agent, or Firm* — Christie, Parker & Hale, LLP

(57) ABSTRACT

A broadcast routing system with dynamic end node response capability includes a first node for creating a request for broadcasting, a broadcasting application running on, or available to the first node for broadcasting the request, one or more destination nodes enabled to monitor a broadcasting channel or channels and to receive the request, and a software routine running on or available to each of the one or more destination nodes for determining which, if any, of more than one destination node may service the request.

18 Claims, 6 Drawing Sheets

(56) References Cited

U.S. PATENT DOCUMENTS

| | | | |
|---|---|---|---|
| 2003/0131129 A1* | 7/2003 | Becker et al. | 709/238 |
| 2006/0143308 A1* | 6/2006 | Cazzolla et al. | 709/248 |
| 2008/0109509 A1* | 5/2008 | Dickerson et al. | 709/201 |

FOREIGN PATENT DOCUMENTS

| | | |
|---|---|---|
| JP | 2009-521747 A | 6/2009 |
| KR | 10-2008-00929 25 | 10/2008 |
| WO | 2004073281 A | 8/2004 |
| WO | 2006056534 A | 6/2006 |
| WO | WO 2007/075413 A2 | 7/2007 |

OTHER PUBLICATIONS

European Office action and Search Report for Patent Application No. 06845536.9, dated Nov. 19, 2009, 9 pages.

Written Opinion for PCT/US2006/047906, mailed on Sep. 19, 2008, 6 pages.

* cited by examiner

SYSTEM AND METHODS FOR LOCATING AND ACQUISITIONING A SERVICE CONNECTION VIA REQUEST BROADCASTING OVER A DATA PACKET NETWORK

CROSS-REFERENCE TO RELATED APPLICATIONS TO BE DETERMINED

Background of the Invention

1. Field of the Invention

The present invention is in the field of peer-to-peer networking over a data packet network and pertains particularly to methods and apparatus for establishing network connections between networked peers by matching skills and profile relevancy to a request for interaction at one or more target endpoint systems subject to receive the interaction request.

2. Discussion of the State of the Art

The art of peer-to-peer networking involves establishing some communication or data sharing connection between 2 nodes connected to a data network. Examples include peer-to-peer media sharing systems and software enabling those systems. Interactive chat systems and software also offer peer-to-peer communications that occur when, for example, one node invites another node into a private session just between the two nodes. In general peer-to-peer networking is well established and known in the art. The Internet network provides the conduit for this type of networking and it may be practiced in conjunction with many types of connecting digital networks such as code division multiple access (CDMA) cellular and time division multiple access (TDMA) cellular networks, corporate LAN networks, home LAN networks, and so on.

One primary purpose of peer-to-peer networking is to distribute resources over a large number of computers or other network capable devices and then to make those devices searchable in a directory in terms of the connection address and the relevant contents or services offered through those devices. One limitation to the traditional peer-to-peer network architecture is that a system may be required to employ a peer directory server that enables the peers in the network to find each other and establish connections with each other. Many peer-to-peer directory servers may also provide certain presence data regarding a particular peers presence relating to instant messaging capability, online presence (active, away, etc.), and so on. Therefore, one peer may browse a directory server, or perform a search of the directory to find a certain peer that can satisfy the goal of the intent of the searching peer, that is to say one that has the files the peer wants, and is online and ready for a transaction. By clicking on that peer entry in the directory server, for example, the requesting peer may immediately begin downloading from or, in some cases, uploading to the other peer in the connection. In other cases the transaction is simply communication such as VoIP, IM, various modes of chat, and Internet based telephony.

In telephony, a peer-to-peer connection with presence information may be thought of as a simple telephone connection between two parties wherein as long as both ends are off-hooked, both parties are considered present. However, like other peer-to-peer connections these communications systems require central routing points and software to route interaction requests. These routing points might be telephony routing switches and software implementations, peer directory servers, or other nodes adapted to handle requests and perform some routing routine to facilitate the connection state between the 2 parties.

A more advanced telephony system known to the inventor enables clients of an enterprise or communications center to access presence information about agents working in a communication center before actually placing calls to the center. The presence information is accessed in real time. Likewise, the center agents have real time access to presence information related to clients for the purposes of call back and redirecting calls. Such presence reporting may involve real time messaging protocol RTMP. Another system known to the inventor provides map able skills presence objects of agents working in a communications center. The skills presence objects are discoverable by a central system, in real time. The central system then uses the skills presence knowledge to route communications requests according to the presence information. In these more advanced telephony systems intelligent routing is enhanced in one case and in the other clients have much more flexibility before committing to initiating a communication request. However, both of these systems also depend on a central server and centralized routing strategy for success connecting the parties together for communication.

What is clearly needed in the art is a system and apparatus that enables peer-to-peer connection states based on actions performed by the peers themselves rather than those performed from a central routing point. A system such as this would enable peers to engage interactions that match their criteria rather than waiting for routed interaction requests from some central routing point or server.

SUMMARY OF THE INVENTION

A broadcast routing system with dynamic end node response capability is provided. The system includes a first node for creating a request for broadcasting, a broadcasting application running on, or available to the first node for broadcasting the request, one or more destination nodes enabled to monitor a broadcasting channel or channels and to receive the request, and a software routine running on or available to each of the one or more destination nodes for determining which, if any, of more than one destination node may service the request.

In one embodiment, the first node is one of a desktop computer, a laptop computer, a cellular telephone, a music player, a personal digital assistant, or a handheld computing device. In one embodiment, the broadcasting application is running on a server node available to the first node through network access. In one embodiment, the network is the Internet network.

In a preferred embodiment, the request includes sender identification including address and contact information and the type of request. In one embodiment, the type of request is equated to a code or number. In one embodiment, the destination nodes are one or a combination of computers, laptops, cellular telephones, personal digital assistants, or Internet protocol telephones. In one embodiment, the software routine is available on a router accessible to the destination nodes via a data packet network.

According to a further aspect of the present invention, the broadcast routing system includes one or more than one network gateway adapted as an intermediary destination node capable of directly routing of received requests or rebroadcast of received requests. In this embodiment, in the case of more than one gateway, load balancing is practiced using pre-assigned traffic load thresholds for each gateway.

In one embodiment, with or without one or more gateways, the first node and the one or more destination nodes can broadcast requests and can receive requests that were broadcast.

According to another aspect of the present invention, a software utility for enabling a computing node to broadcast requests and receive responses to those requests is provided. The utility includes a module for message preparation and classification, a module for address tagging and send scheduling, and a module for receiving responses back from recipient nodes.

According to yet another aspect of the present invention, a software utility for enabling a computing node to receive broadcast requests and to determine to service or not to service a request received is provided. This utility includes a module for monitoring broadcasting network channels, a module for receiving and parsing broadcast messages, and a module for determining if the node may service a request received.

In one embodiment of the broadcast utility, the computing nodes are those operated by customers of an enterprise. In one embodiment of the request receiving utility, the computing nodes are those operated by associates or employees of an enterprise.

According to still another aspect of the present invention, a method is provided for locating a service and for establishing a service connection with the service over a data packet network. The method includes acts for (a) formatting a request of type including instruction for establishing a service connection to initiate fulfillment a service requirement of the request, (b) broadcasting the formatted request from a starting node on the network, the request addressed to end nodes, one or more of which may be capable of servicing the request, (c) receiving the broadcast request at the end nodes addressed to receive the request, parsing the request for type and intent, (d) comparing the type and intent of the received request against service profile information held at each receiving node, (e) upon discovering a match between service requirement of the request and service profile at any of the receiving nodes, accepting the request for servicing, and (f) if request acceptance is approved for any of the accepting nodes, establishing a service connection between the starting node or related implement and the accepting node or related implement.

In one aspect of the method in act (a), the request of type is selected from a list of types and completed by adding information necessary to service the request. In one aspect of the method in act (b), the starting node is one of a desktop computer, a laptop computer, a personal digital assistant, an Internet protocol telephone, a network capable music player, or a cellular telephone. In another aspect, in act (b), the starting node is a server node hosted on the network.

In one aspect of the method, in act (b), the broadcasting is scheduled for repeated broadcast bursts. In one aspect, in act (e), if no match is discovered, ignoring the request or responding with a not serviceable message with or without referral address information for addition to a next broadcast.

In one aspect of the method in act (f), acceptance approval is determined at the starting node. In another aspect, in act (f) acceptance approval is mitigated among the end nodes accepting the request if numbering more than one. In still another aspect, in act (f), approval of an accepting node is performed by a third party node. In this aspect, the third party node is a gateway node.

Now for the first time a novel system and method is provided for location and acquisition of services through broadcasting requests over a network for those services enabling request grabbing by potential service nodes and approval for service acceptance confirmation.

BRIEF DESCRIPTION OF THE DRAWING FIGURES

DETAILED DESCRIPTION

Figure 1:
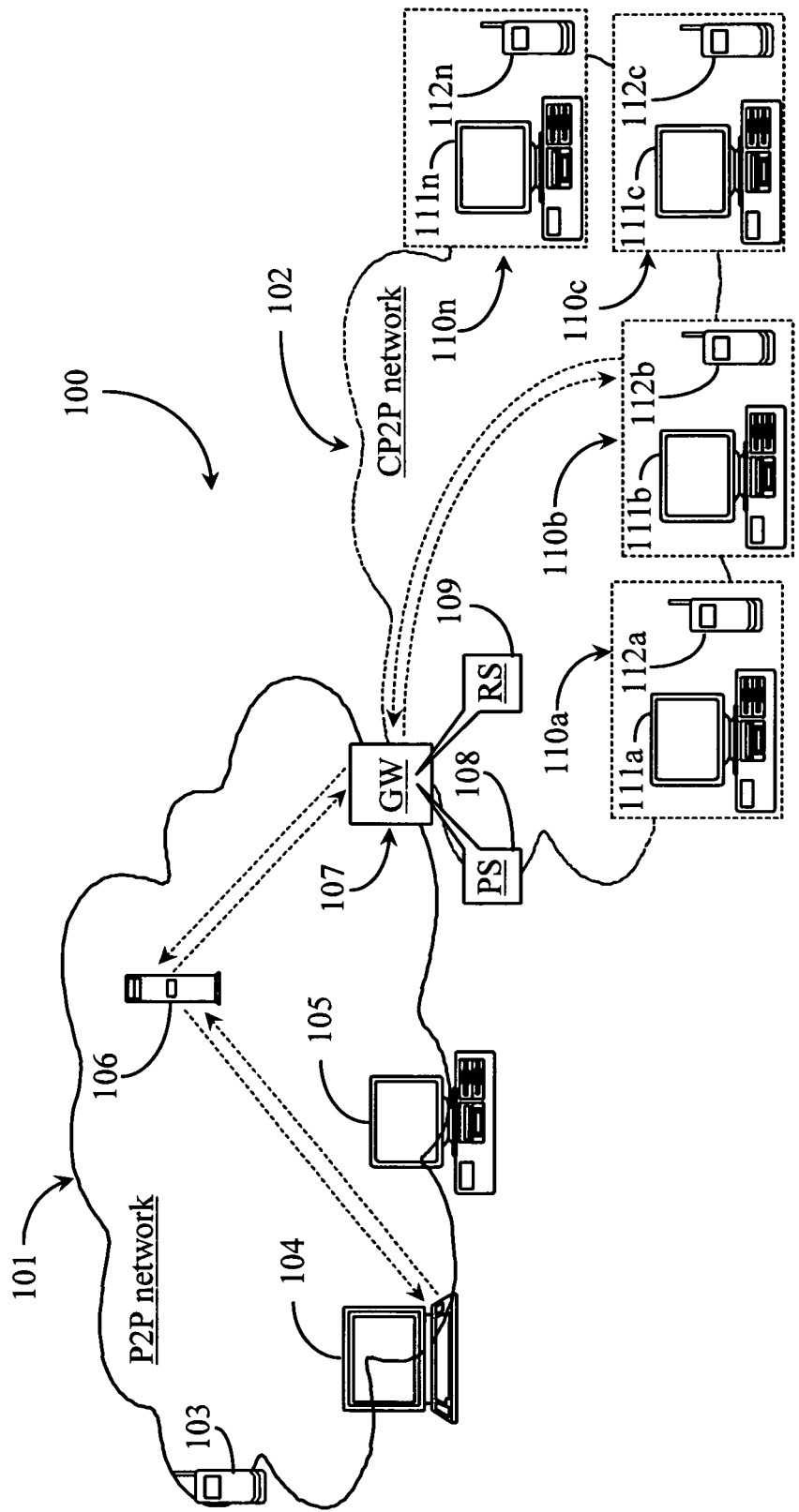
FIG. 1 is an architectural overview of a typical peer-to-peer communications network as known to the inventor.

FIG. 1 is an architectural overview of a typical peer-to-peer communications network 100 as known to the inventor. Peer-to-peer (P2P) communications network 100 is logically divided into two separate P2P networks for the purpose of logical discussion only. These are a public P2P (PP2P) network 101, and a custom P2P (CP2P) network 102.

PP2P network 101 represents a peer-to-peer environment typically available to the public such as one hosted on the Internet network. However, one with skill in the art will recognize that there are many differing physical access methods and network configurations possible and that may be present. PP2P network 101 serves multiple client devices illustrated herein as a client device 103, a client device 104 and a client device 105. In this example, client device 103 is a digital cell phone capable of network access and P2P participation. Client device 104 represents a wireless laptop computer and client device 105 represents a personal desktop computer. One with skill in the art will recognize that other network-capable devices may also be present. Devices 103-105 may also include personal digital assistants (PDAs) and/or other hand-held computing devices capable of accessing a P2P network. Music players capable of downloading music from a peer on a network may also be used.

PP2P network 101 utilizes a directory server 106 as is currently known in the art. Directory server 106 may be one of a variety of server types that enable P2P clients to find one another and to establish some P2P connection between them. In this example, PP2P network 101 has a network gateway (GW) 107 illustrated therein and adapted to route requests leaving the immediate PP2P network that are destined for some node in the adjacent CP2P network. GW 107 may be an edge router with multimedia messaging capability. GW 107 is adapted with a policy server (PS) 108 and a routing server (RS) 109. Servers 108 and 109 are adapted to provide some intelligence to GW 107 with respect to policy and routing strategy. PS 108 and RS 109 may in one aspect be combined or may each stand alone without the other without departing from the spirit and scope of the present invention.

CP2P network 102 contains service stations 110a-n. Service stations 110a-n may be stations that are adapted to perform some particular service for requesting clients whose requests originate within PP2P network 101 and are routed through GW 107 into CP2P network 102 for servicing. The two separate P2P networks 101 and 102 are logically divided, for discussion purposes only, by the type of P2P enabled client according to some enterprise service scheme. The exact P2P service scheme is not directly relevant to the present example.

Stations 110a-110n may be service agents in a call center. In one embodiment, stations 110a-n may be employees of a company. In another embodiment, they could be stations operated by persons affiliated with a particular university. In still another embodiment, they might be stations operated by any of a general population of people in their homes, the homes being served by a company that has a private network, such as CCP2P 102. Each station 110a-110n embodies a desktop computer and a cellular telephone. For example, desktop computers 111a-111n are located one each in respective stations 110a-110n. Likewise, cellular telephones 112a-112n are associated one per in respective stations 110a-110n. One with skill in the art will recognize that other mixes of communication devices may be presented in association with stations 110a-110n without departing from the spirit and scope of the present invention. Examples include laptops, Internet protocol telephones, PDAs, and so on.

GW 107 provides continuity between the two networks 101 and 102. In typical fashion, any of clients 103-105 may access directory server 106 while connected to their prevailing access network in order to form a P2P connection with any other suitable client or station listed in the directory as is known with typical P2P models. Modes of communication may include instant messaging, file sharing, chat, whiteboard software, VoIP telephony and other applications and communications media supported by the networks. That is to say that the exact goal of a P2P request in this example may vary widely. The present model assumes that stations 110a-110n are in place to service clients 103-105 for discussion purposes only.

In a typical use embodiment, client 104 accesses directory server 106 through P2P software (not illustrated) in order to locate a suitable peer somewhere in the network in order to forge a P2P connection with that peer. Directory server 106 may provide typical information including peer profile information and content or service description. Server 106 may also provide specific presence information such as whether the peer is online and taking requests or not. In most instances if a peer node is visible in a directory then it is logged on to its prevailing network and standing by to take requests.

In this example, client 104 accesses directory 106 and selects a particular peer listed in the directory. In this case, the selected peer may be station 110b. In one embodiment, client 104 may not select a peer in directory 106 but may instead select a service group that might include peers 110a-111n. In either case, server 106 forwards the request to GW 107 because the peer or peer grouping selected resides in separate network CP2P 102 as edge nodes, meaning that they are on the edge of the network cloud and the last reachable nodes in the network connection tree with no further child nodes.

In one embodiment, gateway 107 may utilize policy server 108 and/or routing server 109 in the handling of the request forwarded thereto from node 106. In this case, the request may be one that seeks service from one of group 110a-110n. Policy and routing strategy aids GW 107 in determining which station of the group to route the request to. In this case, it is routed to station 110b where the request may be received either on PC 111b or on cell 112b.

In another example, the request forwarded from server 106 to gateway 107 may specifically be for and may identify station 110b as the intended recipient of the request. In this case, client device 104 is used to specifically select station 110b from the directory. GW 107 may not have to consult policy server 108 or routing server 109 in order to forward the request on to station 110b to either PC 111b or to cell 112b.

When station 110b receives the request from gateway 107, there may or may not be some action required depending on the communications scenario. In one case, the request may be a request or invite and a link to chat. The operator of station 110b may be required to accept the invitation. In one case, PC 111b in station 110b may have a share folder from which content may be downloaded. In this case, no further action on the part of an operator of station 110b may be required. The operator has already agreed to share the content so a request is automatically handled by permitting download of the selected content. In many P2P scenarios it is the content that is primarily listed in directory server 106 and that content might be associated in one or more than one version with one or more than one peer that retains a copy of a particular version of that material. For example, peer 110n may have the same content as peer 110b but peer 110b might have a better quality version, or a newer version, or might have more bandwidth for faster delivery of the version of the content identified.

As described further above with respect to the background section, directory server 106 plays a critical role in enabling the client to forge a connection with the selected peer through the gateway in order to fulfill the intent of the original request whatever that may entail. Without directory server 106, the system of this example would not work at all with any geographic significance.

Figure 2:
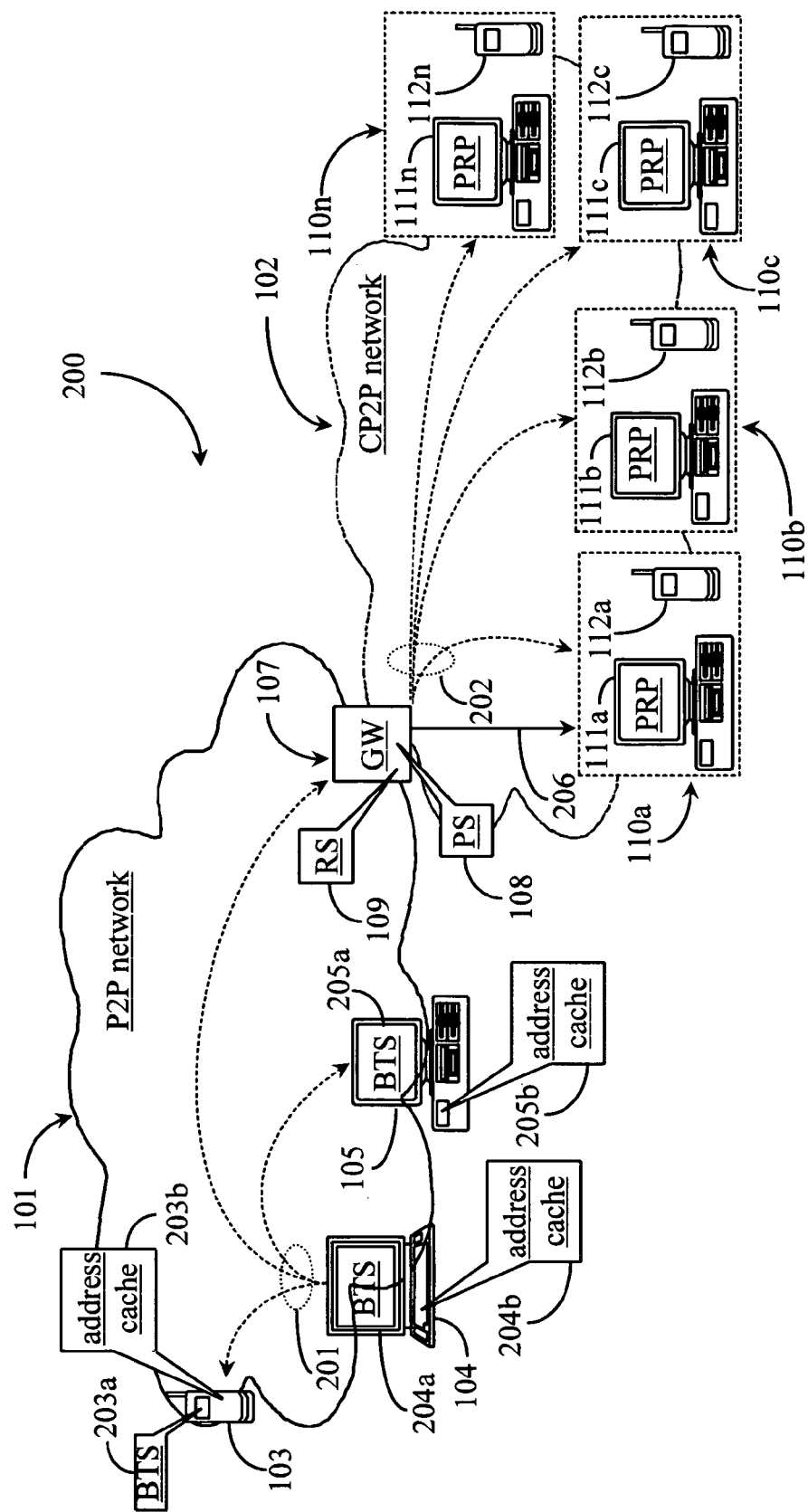
FIG. 2 is an architectural view of a peer-to-peer communications network wherein connections are established according to an embodiment of the present invention.

FIG. 2 is an architectural view of a peer-to-peer communications network 200 wherein peer-to-peer connections are established according to an embodiment of the present invention. Some of the elements illustrated in this example are also illustrated in the example of FIG. 1. Those elements already introduced shall retain their same element numbers and may not be re-introduced.

According to an embodiment of the present invention, clients 103-105 are adapted for digital broadcasting of their specific service requests with suitable broadcast technology software (BTS) 203a installed on device 103; BTS 204a installed on device 104; and BTS 205a installed on client device 105. In addition to broadcast capabilities, clients 103-105 each have at least one address cache provided thereto, or externally available thereto and adapted to store and maintain addressing information, each identified address tuple suitably robust for enabling a request of type to be sent to that peer based on the cached information. Device 103 has an address cache 203b; device 104 has an address cache 204b, and device 105 has an address cache of 205b.

For the purposes of discussion, caches 203b, 204b, and 205b are adapted to maintain and to provide the suitable addressing information for one or more other peers or destinations. The data in each cache might exist in accordance with past peer-to-peer request activity over a certain period. In this embodiment, all requests are broadcast over the network to other peers based on the addressing detailed in the cache of the requester. This is not a limitation of the present invention, but merely one example of how clients use broadcast technology to get requests out to potential peers that may accept those requests.

GW 107 may be enhanced with broadcast capabilities and may also include a cache (not illustrated) of recently used addresses or those that have been used in the past. GW 107 may also retain PS 108 and RS 109 as is illustrated in this example for direct routing without departing from the spirit and scope of the present invention.

In this embodiment, a P2P directory server is not required or utilized. In a preferred embodiment, each client 103-105 uses broadcast technology to propagate requests to potential service end points. Stations 110a-110n in network 102 are enhanced with the capability to receive and act on or "grab" broadcast requests and may also be enhanced with broadcast software (not illustrated). In this example, each station 110a-110n is also enhanced with policy and routing permissions (PRP) defined as one or more rules distributed thereto that may be consulted when a request is received. In this case, PRP rules are consulted when any of the stations receive a request addressed to them and the results of the consultation may determine whether or not a station may accept or "grab" the request resulting in a subsequent direct P2P connection of some communications type between the grabbing station and the sending client.

In this example, client 104 initiates a request and broadcasts a request in a broadcast burst 201 to some or all of the addresses listed in address cache 204b. Unlike typical P2P directory services, no central directory is used or required. The request minimally identifies the sending node and the intent or general goal of the request. The request may contain less information than a traditional routing request to a central routing system. For example, a request broadcast by client 104 may convey that the sender wishes to purchase a translation service from French to English for a series of documents. A request may be coded for easy understanding by gateways and end stations. For example, a type "50" request may be a request for a particular service such as a customer service request related to a particular product. A type 40 request may be a customer service request related to another offered product of an enterprise.

The request is broadcast to clients 103, 105 and to gateway 107. Gateway 107 may rebroadcast the request over CP2P network 102 to stations 110a-110n using its own broadcast burst 202 and its own set of addresses replacing or complimenting the original addresses identified. Likewise, GW 107 may simply rebroadcast the request into CP2P network 102 using only the addresses of the original request that are known to reside in CP2P network 102. Gateway 107 may also provide direct routing if desired without departing from the spirit and scope of the present invention.

In this example, the request goes out through GW 107 to each of stations 110a-110n via broadcast burst 202. There are several possible results from such broadcasting from client 104. One possible result is that one of the local clients in network 101 may accept or "grab" the request on a first come first served bases. In this case, the accepting station will understand the nature of the request and after consulting its own policy and routing rules, if any, may decide that it can fulfill the request. This acceptance is termed a "grab" by the inventor and may result in a direct P2P connection being established between client 104 and client 105 for the purpose of continuing the transaction over the prevailing network. In one embodiment, more than one end station may respond to a request burst, each of the stations having received its own version of the request. The responses may be sent back to the originating client and that client may make a decision regarding which of those "bids" the client will go with. The exact scenario depends largely upon the business model used.

In one embodiment, a local client may not be able to fulfill the goal of the request, but may "know" someone who can and may redirect its request to one or more addresses in its own address cache, or it may respond to the request with a message including one or more addresses from its own cache that may be imported into the cache of the request originator for use in a subsequent burst of the same request including copies of the request to the imported addresses. In one embodiment, any recipient may be enabled to rebroadcast a request to nodes that were not included in the original broadcast of the request. In this embodiment, a second tier node may accept the request and forge a connection to the original sender. Another possible result is that a recipient of a request may simply ignore the request if it is not a suitable destination that may fulfill the request.

In this example, all broadcasts into network 102 are accomplished through GW 107 because of its adaptation for bridging those networks. GW 107 may be a Wireless Fidelity (WiFi) router in one embodiment. In the case that one of stations 110a-110n grabs the request, GW 107 may host the direct P2P connection between client 104 and the station, or the connection between the client and station may be forged some other way such as by telephone or parallel network. In one embodiment, GW 107 may receive a request from client 104 and instead of re-broadcasting the request, it could route the request directly to one of the stations known to be able to fulfill the request after consulting with PS 108 and/or RS 109. A direct routing of the request may be represented herein by direct connection 206 to station 110a, for example.

The method of determining which stations may actually grab a request may depend entirely on distributed routing permissions and other policy rules that may be provided by an enterprise servicing a client base. For example, if an enterprise provides translation services, it may predetermine which of a number of stations will be charged with the responsibility of translating documents from certain languages to certain other languages. In a simple distribution of policy, it may be that station 110a performs English to French and French to English translation or a "type 20" request. Station 110b may be charged with German to Spanish and Spanish to German translation or a "type 30" request. Stations 110c-110n may be charged with translation between other languages not covered by stations 110a or 110b. A type "50" request may indicate "language translation services" in general and the request may specify which of those services are required such as type 50(a) for English to French or French to English. In actual practice, the request may be broadcast from GW 107 to all of the nodes that provide translation services. The node that discovers that its skills definition is a match with the request type then may "grab" or accept the request sending a response back through GW 107 to client 104, in this case. The actual direct P2P connection may be a call back in one embodiment or it may be a response with a direct link that automatically activates and causes the client to navigate to the address to engage the translation service, perhaps hosted in an automated media server.

In this P2P environment direct connections including file transfer protocol (FTP), VoIP, video chat, text chat, white boarding, browser-based follow me, and other forms of communications or file transfer connections traditionally supported through peer-to-peer networking may be practiced using suitable and supported protocols. Moreover, such connections may be hosted through a proxy server or forged over separate networks without departing from the spirit and scope of the present invention.

Figure 3:
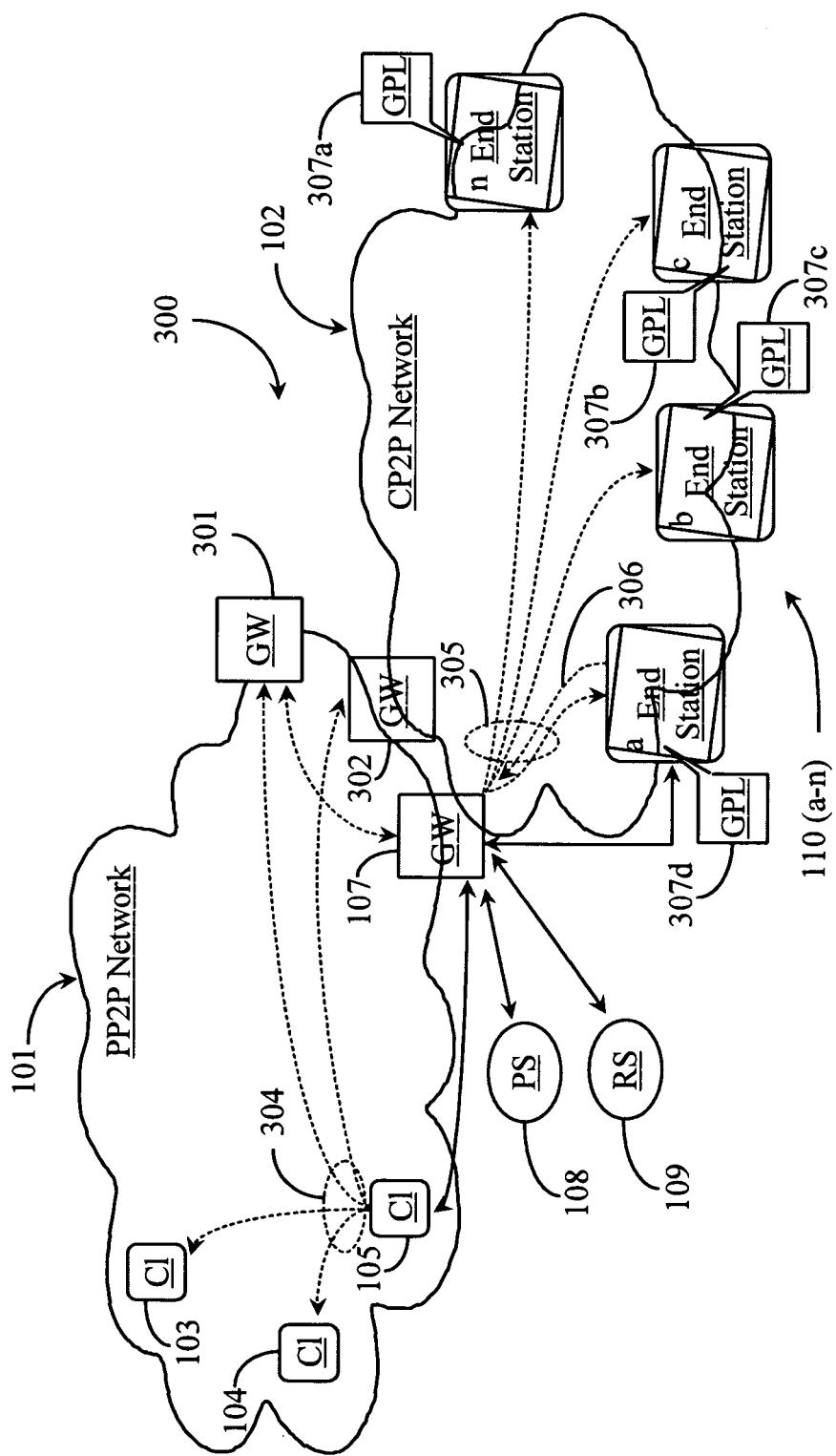
FIG. 3 is an architectural view of a peer-to-peer communications network wherein multiple edge gateways are consulted according to an embodiment of the present invention.

FIG. 3 is an architectural view of a peer-to-peer communications network 300 wherein multiple edge gateways are provided to distribute traffic load according to an embodiment of the present invention. Network 300 includes networks 101 and 102. In this example, the same client configuration, namely clients 103-105 are present as well as the same end station configuration 110 (a-n) as described with respect to FIGS. 1 and 2 above. GW 107, including PS 108 and RS 109 are present in this example and are adapted in much the same fashion as was described previously.

In this example, there are two additional GWs 301 and 302 that may be adapted to receive broadcast requests and to send broadcast bursts in kind with GW 107. Likewise GW 301 and GW 302 may also have their own versions of PS 108 and RS 109 installed. In this variation of the embodiment described above, GWs 107, 301, and 302 may consult with each other to determine which of the GWs can accept and handle a request based on current load conditions, which may be defined as a threshold value and, which may be predetermined for each participating GW. Likewise, a large enterprise might use multiple dedicated gateways into its private P2P network each gateway covering a certain network partition or segment including dedicated service nodes grouped by skills capabilities.

Client 105 may send a request burst, illustrated herein as a request burst 304 out onto network 101 in the same fashion as previously described above. In this case, both GWs 301 and 302 are included in the original burst. GW 107 is not included in the original request burst broadcast from client 105. Each GW in this case has knowledge of the other GWs in network 101 that are configured to practice the present invention. Likewise, each GW has a reportable "state of load" that reflects its current traffic congestion state at any given time. Such information may be provided in a periodically updated table shared by all of the participating GWs. Otherwise, the GWs may consult with each other to share the information.

With respect to burst 304, GW 301 receives a request, but may determine internally that it is too busy to handle the current request. That is to say that its current traffic congestion or load state is at or above its predetermined threshold and it cannot grab any new requests at that time. GW 301 may then pass the request (redirect) to another gateway, which would upon receipt of that request check its own load level. In another embodiment, GW 301 may consult with all of the other GWs including GW 107 and may determine that GW 107, which was not listed as a recipient in the original burst, is free to handle the request. In one embodiment GW 301 may send a response back to client 105 adding the address information of GW 107 to address cache for inclusion into a next broadcast burst of the same request. GW 107 may then receive the request at the next burst and may grab the request. In another embodiment, after consulting with the other GWs and determining that GW 107 is free to handle the request, GW 301 may handoff the request to GW 107 for processing.

In any of the above case scenarios, GW 107 may directly route the request to a suitable end station or service node after consulting PS 108 and/or RS 109. GW 107 may alternatively initiate its own broadcast burst of the request, illustrated herein as burst 305, out over network 102 to end stations 110a-110n. In the case of a rebroadcast burst of the original request station 110a may accept the request and may respond to GW 107 illustrated herein by a response message 306. By virtue of the fact that GW 107 has the original request, it may host the subsequent P2P connection between end station 110a and client 105, illustrated herein by solid bidirectional links between end station 110a and GW 107 and between GW 107 and client 105. Once a request is grabbed and approved, the P2P communication may take place through the same network or through another communications path depending on the nature of the request. For example, a broadcast request message may specify that the end station call the requestor on the telephone. A grab then might include a response message that a telephone call back will shortly occur at contact number specified in the original request.

End stations 110 a-n may be enhanced with a grab priority setting or level (GPL) table illustrated in this example as GPLs 307a-d. GPL 307a is installed at end station 110n, GPL 307b is installed at station 110c, GPL 307c is installed at station 110b, and GPL 307d is installed at station 110a. GPL may be implemented as a weight value at each qualified end station that may be incremented or added to, for example, each time any station 110a-n fails to grab any particular request it analyzes that fits its permissions policy. Therefore, for end stations adapted similarly or identically to service requests, those that have a higher priority level would be more likely to be authorized to grab the request over competing nodes having a lower GPL rating at the time of the request. In this way, communications tasks resulting in requests handled by the group may be more evenly distributed among the group. The GPL scheme might be based on some time window such as enabling a station with the most time elapsing since last servicing a request to service a next request over the competing nodes.

One with skill in the art will recognize that a similar priority scheme may be utilized at each of the GWs as well in order to facilitate load balancing. It should also be noted herein that clients receiving requests in the local network might be similarly adapted without departing from the spirit and scope of the present invention. The inventor logically represents clients 103-105 as requesting nodes and stations 110 9a0n) as servicing nodes for logical illustrative purposes only. In actual practice client nodes and service nodes may be located anywhere in either physical network. In the examples illustrated herein, GW nodes are edge routers or nodes that bridge separate network domains. However, this is not specifically required in order to practice the present invention as any GW may be resident in a same network and may be used simply to divide clients from service stations or service nodes. Likewise, gateways illustrated herein may be infrastructure gateways between two separate wireless cell islands, the Internet used as a conduit between the islands.

In one embodiment of the present invention a gateway is not specifically required in order to practice the invention. In such a case it might be that all of the nodes (clients and service nodes) reside locally on a same ad-hoc wireless network and all of the nodes may "see" all of the other nodes operating on the same network. An example might be that of multiple nodes having differing and dedicated responsibilities related to a group project as a whole whereby collaboration between certain ones of those nodes in the group is necessary for overall success of the project. A request in this embodiment might be originated from an accounting node in the group that is looking for cost data associated with a third-party construction service acquired through the architectural design node in the group. All the nodes may receive the request, but the architectural node would recognize that the request type fits its profile and would provide the data by dropping it into the accounting nodes folder or though some other mechanism.

Figure 4:
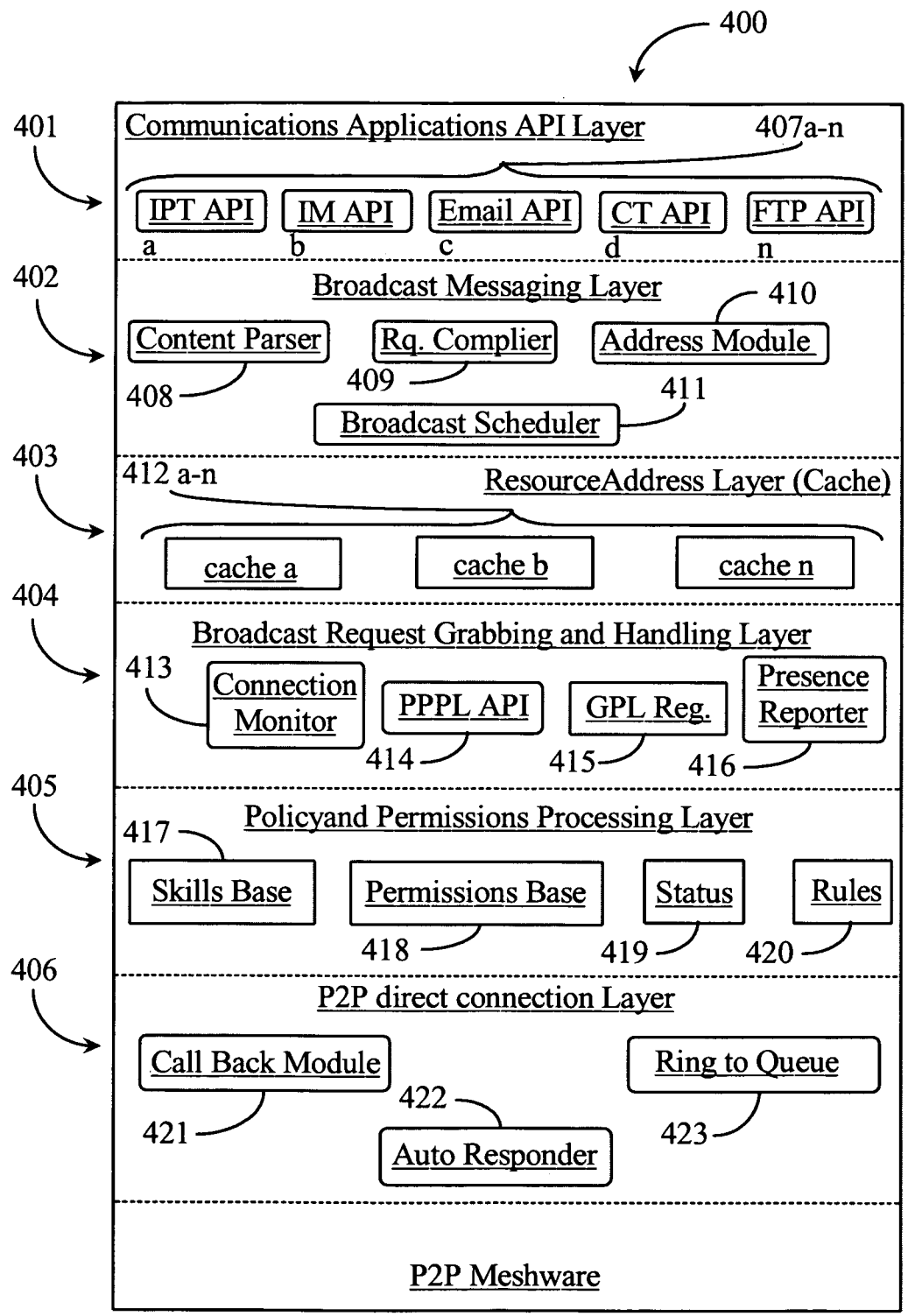
FIG. 4 is a block diagram illustrating layers and components of a peer-to-peer communications application according to an embodiment of the present invention.

FIG. 4 is a block diagram illustrating layers and components of a peer-to-peer communications application 400 according to an embodiment of the present invention. In one embodiment of the present invention, any participating node may be adapted with a single piece of software or application 400 in order to be enhanced to practice the present invention according to embodiments described in this specification. Application 400 may be provided in various versions to different node types wherein those nodes may make use of some or all of the capabilities without departing from the spirit and scope of the invention including. Likewise, application 400 may be distributed in dedicated versions to different node types whereby the features distributed in any particular version define the capabilities of the node.

In a full version, application 400 includes a communications application API layer 401. API layer 401 is adapted to engage resident communication applications installed on and executable from the host node for the purpose of enabling the application to practice the present invention. API layer 401 includes multiple APIs 407 (a-n). An Internet protocol telephony (IPT) API 407a facilitates requests for IPT connections. An instant message (IM) API 407b facilitates requests for IM interactions. Further APIs illustrated in this example include email API 407c, cellular telephone API 407d and FTP API 407n. In one embodiment, clients may use their individual communications applications to create requests for broadcasting to service nodes. Moreover, cached addresses may be organized according to the media type desired for interaction over the P2P media connection eventually established between the client and service nodes.

Application 400 includes a broadcast messaging layer 402. Broadcast messaging layer 402 is adapted to prepare and broadcast requests over the network. Messaging layer 402 interoperates with API layer 401. In one embodiment, raw requests from layer 401 may be received by layer 402 and then prepared for broadcasts. Layer 402 includes a request content parser 408 adapted to parse the intent or goal of the request. A request compiler 409 is provided within layer 402 and may be adapted to organize and compile the request according to prevailing broadcast message protocols. An address module 410 may be provided within layer 402 and may be adapted to fetch addresses that are suitable for defining the audience of a broadcast message. Layer 402 includes a broadcast scheduler 411 may be provided within layer 402 and adapted to schedule a broadcast burst or series of broadcast bursts. In the event a request is created within an application, there may be an intermediary step that converts that request into a particular "type" of request such as request type 50, for example, for quick parsing at the receiving node. Request type architecture may be created by an enterprise and may be made available directly or indirectly to clients of the enterprise.

To further illustrate the above "request type" architecture, an enterprise may provide a Web server with predetermined request types whereby clients may select the type of request and fill in the preference and presence information to be broadcast with the request. In this case, the Web server or proxy may perform the actual broadcasting. The capability may also be downloaded to the client station. The just mentioned example includes the possibility that clients might share a portal that is actually responsible for request broadcasting and address allocation for those broadcast bursts.

Application 400 contains a resource address layer 403 that is adapted to access one or more address books or address caches labeled herein as caches 412 (a-n). In one embodiment, there are multiple separate caches depending on the nature of a request. For example, one cache might contain addresses that are most recently used addresses. Another cache might contain addresses of a particular type such as IM or email addresses. Still another cache may contain IP addresses to voice service terminals or to nodes that share files or folders. There are many possibilities. The particular P2P service enterprise may set up any type of client/server service scenario revolving around products or services offered.

In one embodiment of the invention layers 401-403 comprise a dedicated client application that might be available to any potential clients of an enterprise. In this case, a cache of addresses to servicing nodes might also be provided. For example, multiple addresses provided in one cache or group may be those of an enterprise customer service group where any one in the group can service any customer service request broadcast to that group. Another cache or address group may be that of a sales order processing group whereby any one node in that group posses the skills required for processing orders from clients.

Application 400 includes a broadcast request grabbing and handling layer 404. Layer 404 may be provided or distributed to any node intended to receive broadcast requests. Layer 404 includes a connection monitor 413 adapted to monitor broadcast channels for requests addressed to the host node. While the host node is connected to the network, application 400 is listening for any requests addresses to it. Layer 404 has a policy, permissions processing layer (PPPL) API 414 provided thereto and adapted to communicate with a policy permissions processing layer 405 in order to determine if the host node has permission and the required skills base and other resources for fulfilling a particular request received. In a preferred embodiment, such validation is performed before a request is grabbed and a P2P direct connection is established for fulfillment purposes after the request is approved for servicing.

Layer 404 may include a GPL register 415, which may be analogous to tables 307 (a-d) described with respect to FIG. 3. The GPL register may be incremented in order to add weight to any value that represents priority in comparison with competing nodes. This information may be sharable among the competing nodes over the course of request handling so that any node that is aware of another node in the group that has a higher priority rating at the time a request is received may allow that node to grab the request instead of grabbing the request itself. In this way a group of service nodes performing a same service or function may have a request load evenly distributed among the group.

It is noted herein that in some embodiments, service nodes may be dedicated to provide differing skill levels and may have differing task definitions. In this case, there may only be one node in a group of nodes that can handle a particular type request, which may have been broadcast to the entire group. Still another possibility is that a group of nodes might share an address and the particular request is grabbed according to request content matching with defined service capabilities, skills, permissions, and other rules. Those nodes having profiles that do not match the request content do not grab the request. In still another embodiment a closest matching criteria is used instead of some exact service match. Layer 404 may also have a presence reporter 416 provided thereto and adapted to let a requester determine what presence state the node or node operator is in at the time of a request. In this case some presence information such as online/offline, ready or away, busy or not busy may be reported before a requester accepts a P2P session with the node.

Layer 405, introduced further above, contains a skills base 417, a permissions base 418, a status-reporting module 419, and one or more enterprise rules 420. Skills base 417 provides access to check which skills the operator of the node possesses. Permissions base 418 contains the policy permissions regarding operation and authorization. For example, some nodes may be forbidden to handle or grab any requests from a certain sender even though they might posses the skills to fulfill the request. Status module 419 simply reports current status such as applications running, number of queued requests, predicted wait times, which application or queues are activated, and so on.

Application 400 includes a P2P direct connection layer 406. Layer 406 is adapted to set up the requested P2P session or to otherwise connect the client and station together for the purpose of the business of the request. In one embodiment, a direct connection may be established between local nodes on a same network such as a WiFi network without requiring a router or gateway at all. In another embodiment the connections may be established through media gateways connecting two or more network segments. In still other embodiments proxy servers, router, or telephony switches may host P2P communications resulting from broadcast requests grabbed by end point destination nodes.

In some embodiments, connection layer 406 may include optional features like a call back module 421 for establishing a telephone call. An automatic responder 422 may be provided for servicing a connection with instant information without the aid of a human operator. A ring to queue module 423 might be available within layer 406 for queuing more than one waiting connection task while a current transaction is occurring on the node. In one embodiment, application layer 404 may include a request grab alert module (not illustrated) that provides a visual alert to the nodes operator informing the operator to initiate a call back or some communication event back to the request originator, the alert containing the contact telephone number, email address, or other address depending on media type. APIs may be provided as described above for engaging those communications applications and initiating the connections accordingly. There are many possibilities.

Figure 5:
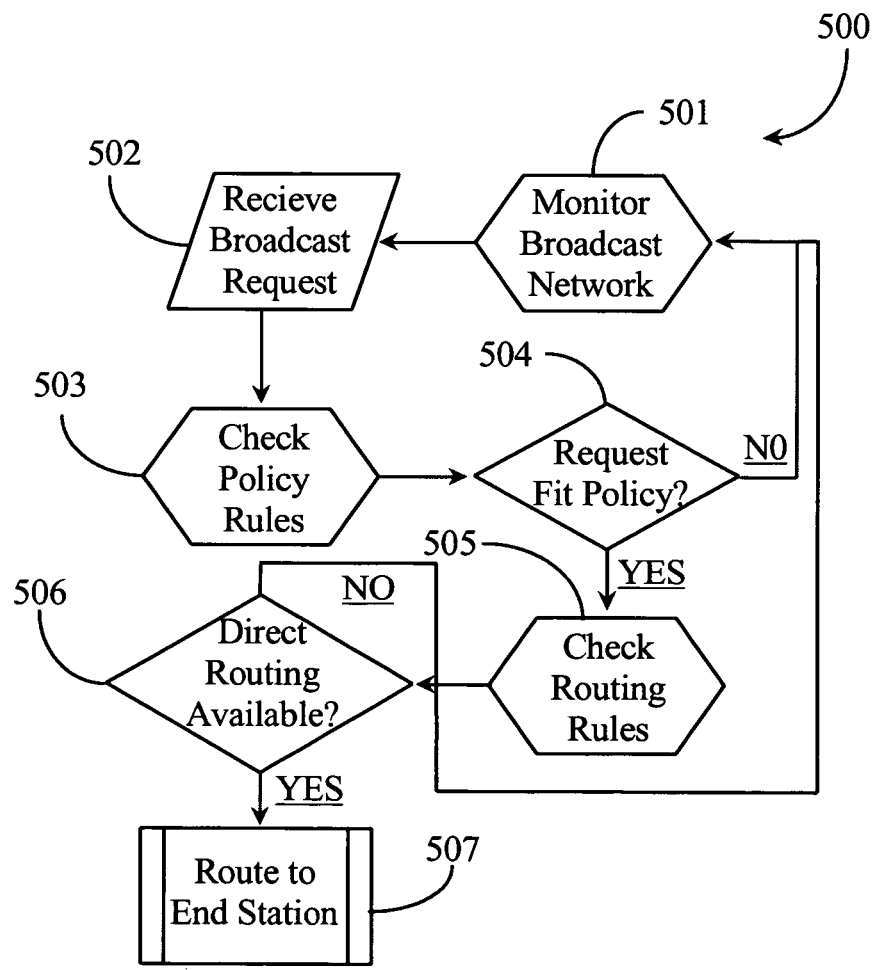
FIG. 5 is a process flow chart illustrating peer-to-peer broadcasting combined with routing according to an embodiment of the present invention.

FIG. 5 is a process flow chart 500 illustrating acts for receiving and handling a request at a gateway unit according to an embodiment of the present invention. At act 501, the gateway unit monitors the broadcast channel or network for any requests that are addressed to it. At act 502, the gateway unit receives a broadcast request.

At act 503, the gateway unit checks policy rules in order to determine if it can handle the request. In this act, it is assumed that the gateway has parsed the request for type or intent. In act 504, the gateway unit decides if policy rules will allow handling of the request. If in act 504, policy does not permit handling of the particular request, then the request may be ignored and the process may resolve back to act 501. Act 501 is an ongoing state while the gateway is booted up and logged into the network.

If at act 504 the request type fits current policy, then the gateway checks available routing rules at act 505 in order to determine if there is a direct routing strategy for routing the request to an end station. At act 506 if it is determined that there is no available routing strategy for handling the request then the request may be dropped and the process may resolve back to act 501 to monitor for more incoming requests. However, if a direct routing rule is available in act 506, then the gateway unit may directly route the request to a suitable end station in act 507, perhaps a station identified in the routing scheme.

In one variation to this process, if no direct routing scheme or rule is available for the type request, then the gateway unit may rebroadcast the request to multiple end stations in its network in the case that at least one of the stations receiving the request will be authorized to grab that request. In still another variation, if the gateway unit checks policy and determines that it may not handle the request, then it may redirect the request to one or more additional gateways where a process for determining whether or not the receiving gateways may handle the request is repeated for each gateway until one is able to route the request to a suitable target or edge unit. In each of the cases of additional gateways receiving the request, the option for rebroadcast the request to potential targets still exists in lieu of a direct routing scheme.

Figure 6:
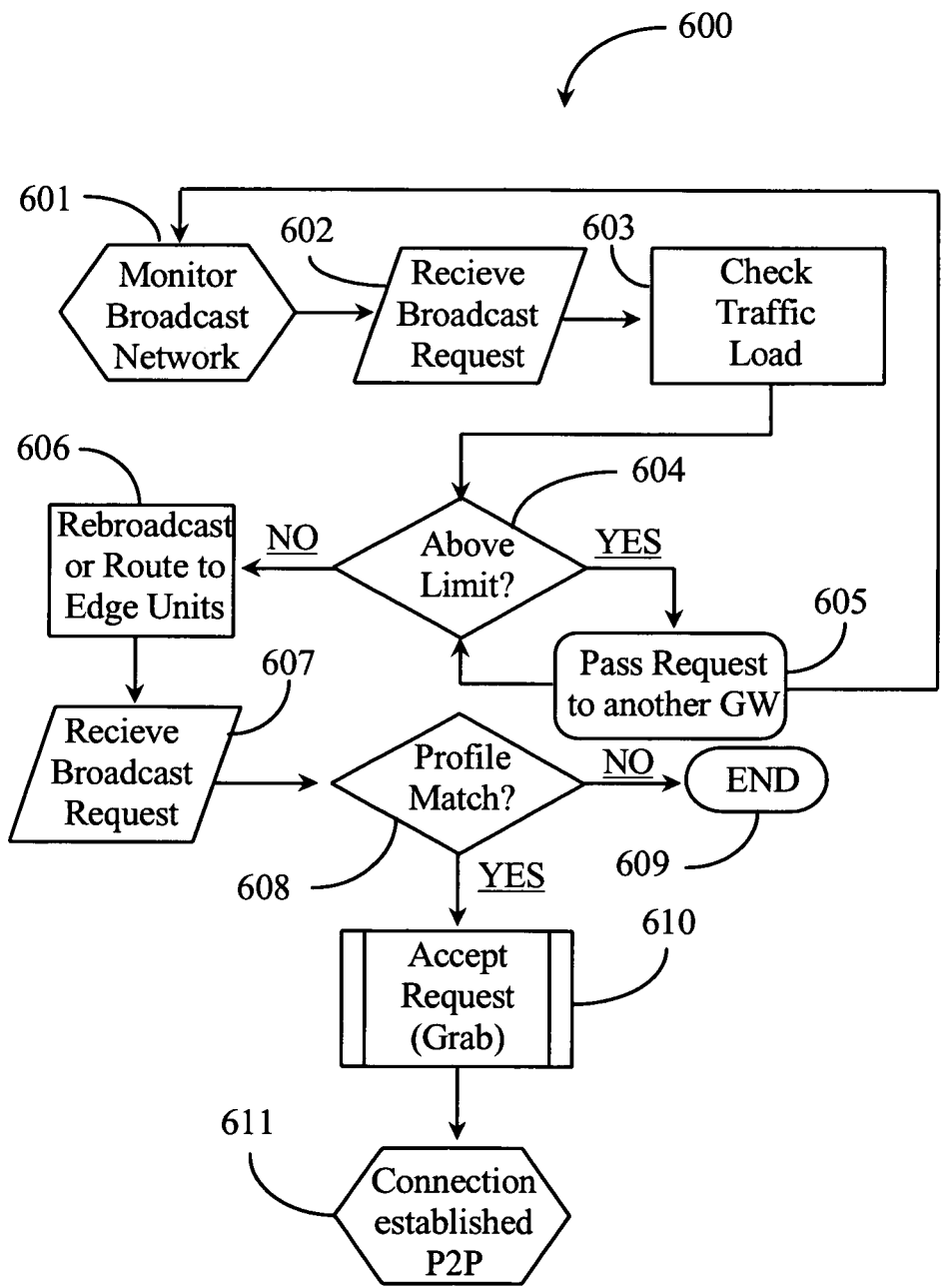
FIG. 6 is a process flow chart illustrating acts for handling a received request according to one embodiment of the present invention.

FIG. 6 is a process flow chart 600 illustrating acts for handling a received request at a gateway according to one embodiment of the present invention. At act 601, the gateway monitors the broadcast network or channel for any requests addressed to it. At act 602, the gateway receives a request from a client. At act 603, the gateway checks traffic load through the gateway in order to determine if it is free to handle the request. At act 604, if the traffic load is above a preset limit for that particular gateway, then that gateway passes the request to another gateway at act 605. The process loops at that gateway back to act 604. The request may be dropped if no gateways can handle the request.

At act 604 if a gateway is below the preset load threshold at the time of receiving a request, then at act 606 that gateway may rebroadcast the request to suitable end stations or, if routing is available, it may alternately directly route the request to an edge unit. In the case of a rebroadcast, at act 607 an end station receives the request addressed to it from the gateway. At act 608, the receiving station determines or verifies that there is a profile match between its own policies or permissions including skills and service definitions to the request type received. If at act 608 there is no match then the process may end with an ignored request at act 609.

If at act 608 the profile of the receiving unit matches the request type, then at act 610 the station may grab the request sending a response to the original sender that it may service the request. In one embodiment, it may be an automatic grab where no further approval is required. In another embodiment, there may be a wait window of time to make sure that some priority scheme set up among more than one service node is mitigated between the nodes before the node may actually service the request. At act 611 the end station that accepted the request in step 610 may engage the request originator according to the request preferences if any and communications protocols established. Act 611 may involve one of many types of communications connections without departing from the spirit and scope of the present invention. For example, a grab may entail a ring through event to the end stations telephone number or queue, the original request resulting from a telephone call placed by the requester. In another example, the grab may entail initiating a direct file share connection between the peers through the gateway. In still another example, the grab may entail a call back to the originators telephone number from the end station. There are many possibilities the scope of which is only limited by available connection and communication methods.

The methods and apparatus of the present invention may be practiced over any type of data network that supports broadcast technology and bidirectional data flow including wireless and wire line digital networks and segments bridged by routers or gateways. The client may originate a request in a variety of ways without departing from the spirit and scope of the present invention. The client may broadcast a request or it may use an intermediate node to broadcast the request without departing from the spirit and scope of the invention. Actual connections resulting from request grabbing may occur over the same or over parallel networks without departing from the spirit and scope of the present invention. In one example, a client working within an application commonly used in collaborating may define a need within that application the definition resulting in a request for fulfillment of that need. For example, an accountant working in a spreadsheet may discover that some data is required that is not immediately available to the host node and must be supplied by a source external to that node. The user may define the need as a type request, for example "request for data" and "sales total for product A/2005". The broadcast request may match profile to another node that currently holds the required data or a report containing the data. That node may then grab the request forge the connection and transfer the required data.

There are many possible variant business models that may use the method and apparatus of the present invention in customer service, sales, collaboration, data synchronization, and so on. The methods and apparatus of the present invention should be afforded the broadest scope possible under examination. The spirit and scope of the present invention shall not be limited herein except by the claims, which follow.

What is claimed is:

1. A computing node configured to service a request, comprising:
   a processor; and
   a memory, wherein the memory stores instructions that, when executed by the processor, cause the processor to:
   receive the request from a first node, wherein the request is broadcast to a plurality of computing nodes communicating with one another on a peer-to-peer network, the plurality of computing nodes comprising the computing node receiving the request;
   identify at least two computing nodes from among the plurality of computing nodes for servicing the request;
   accept or not accept the request at the computing node receiving the request, based on the identification and priority information corresponding to the at least two computing nodes, the priority information being shared by the plurality of computing nodes; and
   send referral information to the first node, the referral information identifying an alternative computing node, if the computing node does not accept the request.

2. The computing node of claim 1, wherein the at least two computing nodes for servicing the request are identified based on skills of the plurality of computing nodes.

3. The computing node of claim 1, wherein the instructions, when executed, further cause the processor to rebroadcast the request to the alternative computing node, if the computing node does not accept the request.

4. The computing node of claim 3, wherein the alternative computing node is outside of the peer-to-peer network.

5. The computing node of claim 1, wherein a connection is established between the computing node and the first node if the computing node accepts the request.

6. The computing node of claim 1, wherein the first node comprises a plurality of gateway units.

7. The computing node of claim 6, wherein each gateway unit of the plurality of gateway units is configured to determine which gateway unit can handle the request based on load information of the gateway units, and pass the request to the gateway unit with the lightest load.

8. The computing node of claim 1, wherein a priority level for the computing node is increased when the computing node does not accept a request.

9. The computing node of claim 1, wherein a priority level for the computing node is increased according to an amount of time elapsed since the computing node last accepted a request.

10. A method of servicing a request received by a computing node, the method comprising:
    receiving the request from a first node, wherein the request is broadcast to a plurality of computing nodes communicating with one another on a peer-to-peer network, the plurality of computing nodes comprising the computing node receiving the request;
    identifying at least two computing nodes from among the plurality of computing nodes for servicing the request;
    accepting or not accepting the request at the computing node receiving the request, based on the identification and priority information corresponding to the at least two computing nodes, the priority information being shared by the plurality of computing nodes; and
    sending referral information to the first node, the referral information identifying an alternative computing node, if the computing node does not accept the request.

11. The method of claim 10, wherein the at least two computing nodes for servicing the request are identified based on skills of the plurality of computing nodes.

12. The method of claim 10, further comprising rebroadcasting the request to the alternative computing node, if the computing node does not accept the request.

13. The method of claim 12, wherein the alternative computing node is outside of the peer-to-peer network.

14. The method of claim 10, wherein a connection is established between the computing node and the first node if the computing node accepts the request.

15. The method of claim 10, wherein the first node comprises a plurality of gateway units.

16. The method of claim 15, wherein each gateway unit of the plurality of gateway units is configured to determine which gateway unit can handle the request based on load information of the gateway units, and pass the request to the gateway unit with the lightest load.

17. The method of claim 10, wherein a priority level for the computing node is increased when the computing node does not accept a request.

18. The method of claim 10, wherein a priority level for the computing node is increased according to an amount of time elapsed since the computing node last accepted a request.

* * * * *